Figure 1:
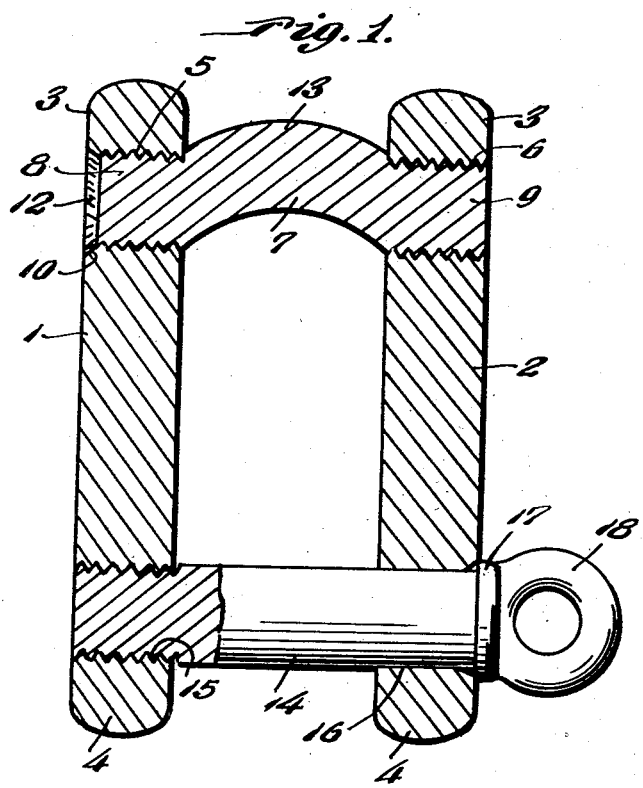

Feb. 3, 1948. R. E. BELVEL 2,435,336
SHACKLE
Filed Aug. 9, 1944

Inventor
Robert E. Belvel

By Clarence A. O'Brien
and Harvey B. Jacobson
Attorneys

Patented Feb. 3, 1948

2,435,336

UNITED STATES PATENT OFFICE 2,435,336

SHACKLE

Robert E. Belvel, Hayward, Calif.

Application August 9, 1944, Serial No. 548,771

2 Claims. (Cl. 59—86)

My invention relates to improvements in shackles for use, more particularly, in rigging, the principal object in view being to provide a simply constructed, inexpensive shackle which may be easily and quickly taken apart, should occasion require, and which is constructed for self-centering in the line of pull against rigging in which it may be attached.

Other and subordinate objects are also comprehended by my invention, all of which, together with the precise nature of my improvements, will be readily understood when the succeeding description and claims are read with reference to the drawing accompanying and forming part of this specification.

Figure 2:
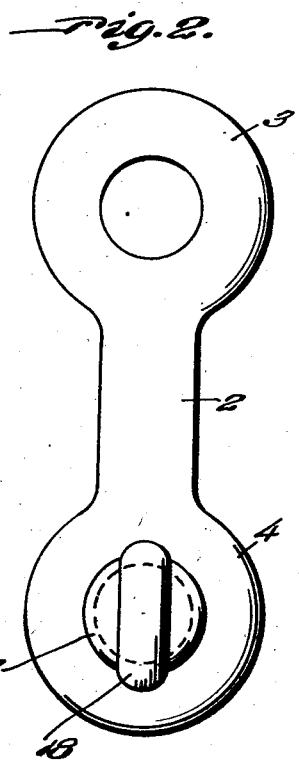
Figure 3:
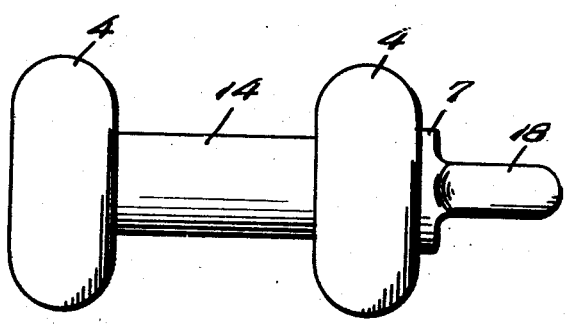

In said drawing:

Figure 1 is a view in longitudinal section of my improved shackle in the preferred embodiment thereof, Figure 2 is a view in side elevation, Figure 3 is a view in end elevation.

Referring to the drawing by numerals, my improved shackle, as shown, comprises a pair of opposed, flat, side links 1, 2 having terminal, enlarged eyes opposed in pairs 3, 4. The pair of eyes 3 are internally threaded, as at 5, 6, and connected together by a cross pin 7 having threaded ends 8, 9 turned into the threads 5, 6. The eye 3 of one link, for instance, that designated 1, has a beveled edge forming a countersink 11 in which the end 8 of the cross pin 7 is welded, as at 12, to provide a permanent connection between said link and pin at one end of the link. Between the ends 8, 9 thereof, the cross pin 7 is bowed, as at 13, outwardly of said links 1, 2 and in a common plane with said links for a purpose presently seen. The other pair of eyes 4 is connected together by a cross pin 14 having a threaded end 15 turned into threads in the eye of the link 1 to which the pin 7 is permanently connected. The pin 14 is slidably fitted in a bore 16 in the other eye of the pair 4 and provided with a shoulder 17 for bearing against said other eye, and an eye-like head 18 on said shoulder for the insertion of a tool therethrough in turning said pin 14.

All of the described threads are right handed standard threads, with the exception of those forming the described permanent connection, which are finer machine threads.

To take the described shackle apart, it is merely necessary to remove the pin 14 and then unscrew the link 2 off the end 9 of the cross pin 7. When the described shackle is interposed in a line of rigging, under pull of said line, the bowed part 13 of the cross pin 7, if attached to one end of the line, will tend to center the shackle in the line in a manner which will be clear. The manner in which the parts of the shackle may be put together will be clear from the description of the manner in which the shackle is taken apart. The shackle forming the subject matter of this application has a high degree of utility in riggings due to the ease with which it may be interposed in a line. It is well-known, of course, that ordinary or conventional shackles utilize enlarged eyes to receive the connecting cross-pin and as a result, when dealing with chains or like limited clearance fittings, it is generally necessary to forge in a special shackle link to accommodate the sizeable shackle eye. Thus it frequently occurs that a blacksmith will be needed to connect the elements of the line and install the shackle member, occasioning costly delay. The shackle disclosed herein may be interposed in the line by a rigger or mechanic, on the spot, without the aid of special tools or in fact any tools, other than in those situations where an extra tight connection of pin 14 is desired, in which case a nail or like object inserted through eye 18 will serve the purpose.

For example, my shackle may be broken down into its component elements by simply removing pin 14 and cranking off link 2, leaving link 1 with its integral cross pin 7 as a starting point in making the desired connection. In connecting a chain and anchor, for instance, the cross pin 7 is inserted in the chain end link and link 2 is cranked back onto the threaded end of pin 7. Pin 14 is then inserted through the bore 16 in link 2, through the anchor shank eye or link and then screwed into link 1. As stated above, this is normally a hand operation in its entirety necessitating no tools of any kind.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A shackle comprising a pair of opposed side links, and a pair of cross pins connecting said links together at opposite ends thereof, one of said pins being permanently connected at one of its ends to one of said links and having the other link threaded onto its other end to permit the cranking detachment thereof, the other cross pin being slidably extended through said other link and having an end threaded into the link to which said one cross pin is permanently connected.

2. A shackle comprising a pair of opposed side links, and a pair of cross pins connecting said links together at opposite ends thereof, one of said pins being permanently connected at one of its ends to one of said links and having the other link threaded onto its other end to permit the cranking detachment thereof, the other cross pin being slidably extended through said other link and having an end threaded into the link to which said one cross pin is permanently connected, the permanently connected cross pin being bowed between said links toward the adjacent ends of said links.

ROBERT E. BELVEL.

REFERENCES CITED

The following references are of record in the file of this patent:

UNITED STATES PATENTS

| Number | Name | Date |
|---|---|---|
| 490,409 | Herman | Jan. 24, 1893 |
| 1,261,889 | Zukiwski | Apr. 9, 1918 |
| 1,458,622 | Higgins | June 12, 1923 |

FOREIGN PATENTS

| Number | Country | Date |
|---|---|---|
| 197,289 | Great Britain | Nov. 22, 1923 |